Sept. 16, 1947.  C. J. GLANZER  2,427,525
COMBINED LIQUID-WASHED FILTER AND RELIEF VALVE
Filed Oct. 16, 1944

INVENTOR.
CLARENCE J. GLANZER
BY Hyde and Meyer
ATTORNEYS.

Patented Sept. 16, 1947

2,427,525

UNITED STATES PATENT OFFICE 2,427,525

COMBINED LIQUID-WASHED FILTER AND RELIEF VALVE

Clarence J. Glanzer, Northfield Center, Ohio, assignor to Air-Maze Corporation, Cleveland, Ohio, a corporation of Delaware Application October 16, 1944, Serial No. 558,921

1 Claim. (Cl. 183—39)

This invention relates to improvements in a relief valve combined with a liquid-washed filter and provides improved means for quickly relieving a pressure condition downstream from the filter so as to prevent a back pressure from blowing liquid out of the filter.

One of the applications of the present invention occurs in connection with an air filter of the liquid-washed type as applied to the suction pipe of an air compressor of the free-unloading type. When a filter is connected in this fashion and the compressor is unloaded (particularly at the higher speeds), there is a sudden rush of air under pressure upstream of the inlet pipe and this generally blows the liquid out of the filter.

Another application of the invention would occur where an air cleaning filter of the liquid-washed type was applied to the air inlet of an internal combustion engine. When a backfire occurs in the engine, there is a tendency to blow the liquid out of the filter.

It is an object of the present invention to relieve the pressure in the inlet pipe the moment the pressure occurs. At the same time, it is desirable to positively prevent the transmission of the pressure to the filter so as to prevent liquid being blown out of the filter.

In the drawings,

Fig. 2 is a partial sectional view taken along the line 2—2 of Fig. 1; while

Figure 1:
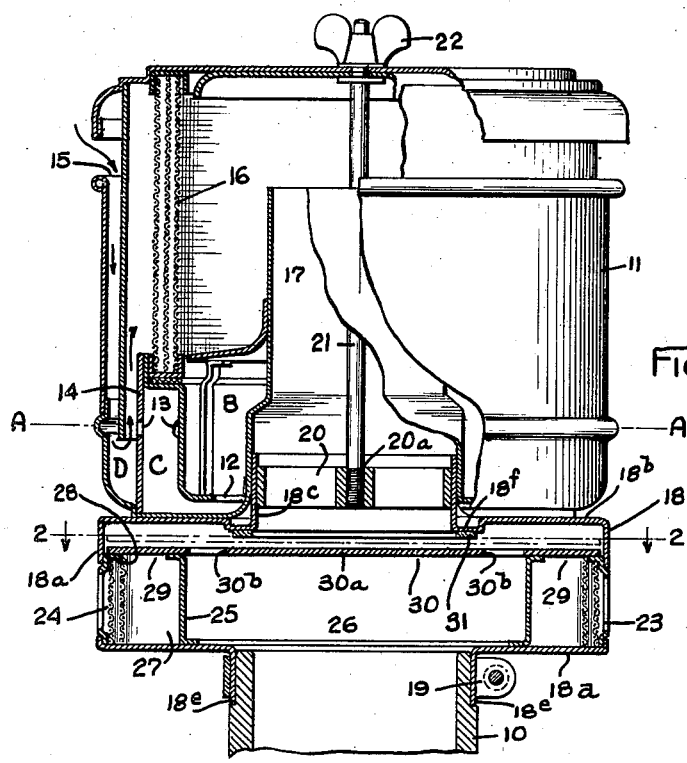
Fig. 1 is an elevational view of a filter and conduit connection equipped with one form of my relief valve with certain of the parts broken away in section to more clearly show the construction.

In the embodiment of my invention chosen for illustration in Fig. 1, I have shown the conduit connection 10 which is the inlet pipe for an air compressor of the free-unloading type. The filter 11 is for the purpose of cleaning the air normally sucked through the connection 10 to the compressor. I have chosen to illustrate a filter of the type shown in my copending patent application Serial Number 464,127, filed January 30, 1943, but it should be understood that many other types of filters might be used in the same location. This type of filter is filled with a liquid such as oil up to the level of the line A filling the inner chamber B, the intermediate chamber C, and the outer chamber D to the same level. Communication between chambers B and C is by means of opening 12. Communication between chambers C and D is by means of a plurality of openings 13 through the partition wall 14. Air entering the filter inlet 15 in the direction of the arrows passes through the chamber D carrying oil with it to wash the filter element 16 through which the air passes to escape through the outlet 17. During further operation of the filter, oil slowly trickles from chamber C to chamber D through the openings 13 so that the filter element 16 is continually washed. Reference may be had to my copending application mentioned above for further details. It is obvious that in apparatus of this kind upon the occurrence of a sudden pressure in the conduit connection 10 air will flow in direction reverse to the arrows indicated in Fig. 1 and will blow oil or other liquid out the opening 15. It is the purpose of my invention to prevent this.

Figure 2:
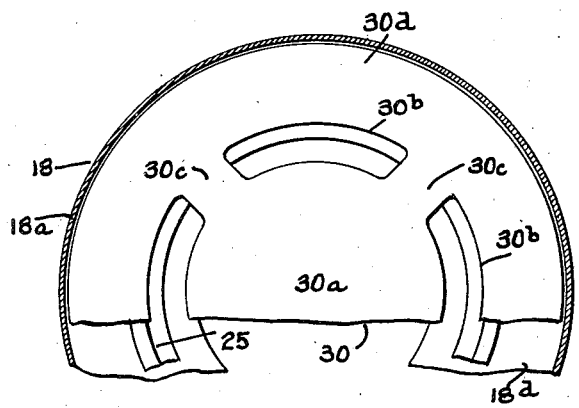

Between the conduit connection 10 and the outlet 17 of the filter, I place my improved pressure relief device 18. In the form shown in Figs. 1 and 2, this comprises a housing having a side wall 18a cylindrical in form as illustrated, this form not being functionally necessary but being selected because it is the cheapest to form. The top wall of the housing 18b has a centrally upturned neck 18c which fits snugly within the outlet 17 of the filter. The bottom wall 18d is provided with a downwardly extending neck 18e which is clamped to the conduit connection 10 by the band clamp 19. Rigidly connected with the neck 18c is a spider 20 having a centrally threaded opening 20a, threaded to receive the bolt 21 on the other end of which is screwed the thumb screw 22 which thus holds the housing 18 tightly connected to the filter outlet and at the same time holds the parts of the filter in assembled relation.

Through the wall 18a of the housing 18, I provide a plurality of openings 23, and inside the housing I secure by suitable means a filter element 24 for a purpose later described. A cylindrical partition wall 25 divides the lower portion of the housing 18 into a central chamber 26 and an annular outer chamber 27. The top of partition 25 and an angularly shaped bracket 28 secured to the inner face of the wall 18a provide a valved opening 29. Above this valved opening, I provide a plate 30 generally circular in form and fitting closely against the inside face of the wall 18a. This plate is preferably of light metal or a suitable plastic so that it is easily raised by an air stream as will be presently described. The central portion of this plate at 30a is imperforate over the entire area of the neck 18c. Located on a diameter slightly larger than the neck 18c are a plurality of openings 30b through the plate. Four of these annular openings are illustrated separated by bridge portions 30c. The portion of the plate 30d radially outside of the openings 30b is imperforate.

When the airflow through the filter 11 and the conduit connection 10 is in the normal direction as indicated by the arrows of Fig. 1, there is a suction in the conduit connection 10, and the plate 30 is in the full-line position shown in Fig. 1. During this normal operation, the air flows downwardly through the neck 18c, through the openings 30b, and through the connection 10. At this time, the valved opening 29 is closed by the portion 30d of the plate 30. Upon the occurrence of sudden pressure in the connection 20, there is a rush of air upwardly through this connection against the imperforate central portion 30a of the plate 30. This lifts the plate 30 against the annular ring valve seat 18f formed around the neck 18c. Preferably a gasket or curbing member 31 is provided on this ring to prevent excessive noise and to give better sealing action. The central portion 30a of plate 30 now effectively closes the neck 18c against flow of air through filter 11 in a direction reversed to the arrows of Fig. 1 and thus prevents the blowing of oil or other liquid out of the filter. At the same time when plate 30 is raised to the dot-dash position of Fig. 1 above described, it is lifted above the openings 29 so that air from chamber 26 can now escape directly over the partition wall 25 to the chamber 27 where it passes outwardly through the filter element 24 and the openings 23. As soon as the pressure in conduit 10 is replaced by suction, the plate 30 returns to its full-line position of Fig. 1, and the normal flow of air occurs as before.

The purpose of the filter element 24 is to filter any air which might be drawn in through the openings 23 upon the sudden occurrence of suction in the connection 10 before plate 30 has fully closed the openings 29.

Figure 3:
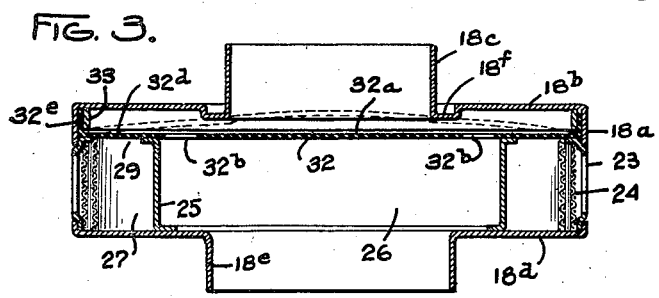
Fig. 3 is a sectional view similar to a portion of Fig. 1, but showing a modified form of relief valve.

The modification shown in Fig. 3 is similar in many respects to that just described and similar parts having the same functions have been given the same reference characters. The only difference functionally is that in place of the plate 30 I have substituted a flexible diaphragm member 32. In plan view this diaphragm member is like Fig. 2 having a central imperforate portion 32a, an annular series of openings 32b outside of which is an annular imperforate portion 32d. However, radially outside of the portion 32d, a portion 32e of the diaphragm is turned upwardly along the inner face of the wall 18a, and a securing band 33 holds the diaphragm edge 32e tightly against the wall 18a.

The operation of the device of Fig. 3 should now be clear. With airflow in the direction of the arrows of Fig. 1, air passing through the filter outlet 17 travels through the neck 18c of the device of Fig. 3, through the openings 32b and discharges from the neck 18e of Fig. 3 into a conduit 10 or the like. The diaphragm 32 is then in the full line position of Fig. 3, and the portion 32d of the diaphragm closes the openings 29 leading into the chamber 27. Upon the occurrence of the sudden back pressure in conduit 10, the diaphragm 32 is raised to the dotted line position of Fig. 3 thus sealing off the neck 18c and preventing backflow through the filter 11. At the same time, the raised diaphragm clears the partition wall 25 permitting flow from chamber 26 over wall 25 through openings 29 and thence through chamber 27, filter element 24, and openings 23 to the atmosphere. During rapid vibration of the diaphragm 32 such as occurs in a free-air unloading compressor, there may be some air drawn through the openings 23 and 29 into the conduit 10 upon the sudden occurrence of a suction there and prior to the return of diaphragm 32 to the full line position of Fig. 3. At such times, the filter element 24 will clean any air passing therethrough so that at all times air passing through the conduit 10 is filtered.

What I claim is:

A relief valve for insertion between a liquid washed filter and the air intake conduit to an engine, said valve comprising a cylindrical housing with vertical axis provided with an upper and lower opening in its ends for connection to the said filter and air intake respectively, cylindrical partition means in said valve providing an annular chamber radially outside said partition means and open at the top and positioned radially outwardly from said first named opening, the opening of said annular chamber lying in a plane below the plane of said first named opening, there being a chamber radially inside of said cylindrical partition communicating with said conduit connection to said engine, a reciprocable valve element lying between said two planes and adapted to be moved between said openings by changes in air pressure on opposite sides of said valve element, said valve element having an imperforate central portion adapted to close said first named opening and positioned opposite said conduit connection to said engine, said valve element having an imperforate outer portion adapted to close the opening of said annular chamber, and there being openings through said valve element between said central and outer portions communicating with said chamber radially inside of said cylindrical partition means.

CLARENCE J. GLANZER.

REFERENCES CITED

The following references are of record in the file of this patent:

UNITED STATES PATENTS

| Number | Name | Date |
| --- | --- | --- |
| 578,481 | Coe | Mar. 9, 1897 |
| 2,331,602 | Edwards | Oct. 12, 1943 |
| 2,151,593 | Glanzer | Mar. 21, 1939 |
| 1,552,866 | Miller | Sept. 8, 1925 |
| 2,208,673 | Hopkins | July 23, 1940 |
| 993,516 | Gentle | May 30, 1911 |
| 1,640,291 | Perkins | Aug. 23, 1927 |
| 917,294 | Harrington | Apr. 6, 1909 |

FOREIGN PATENTS

| Number | Country | Date |
| --- | --- | --- |
| 26,427 | Great Britain, 1908 | Mar. 6, 1909 |